UNITED STATES PATENT OFFICE.

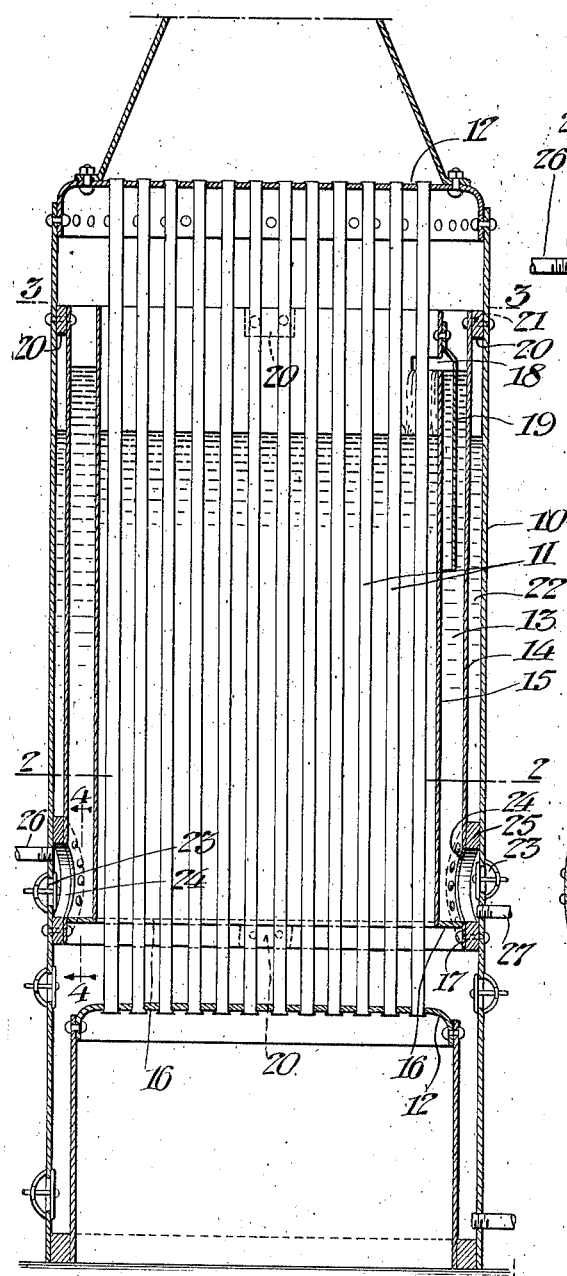
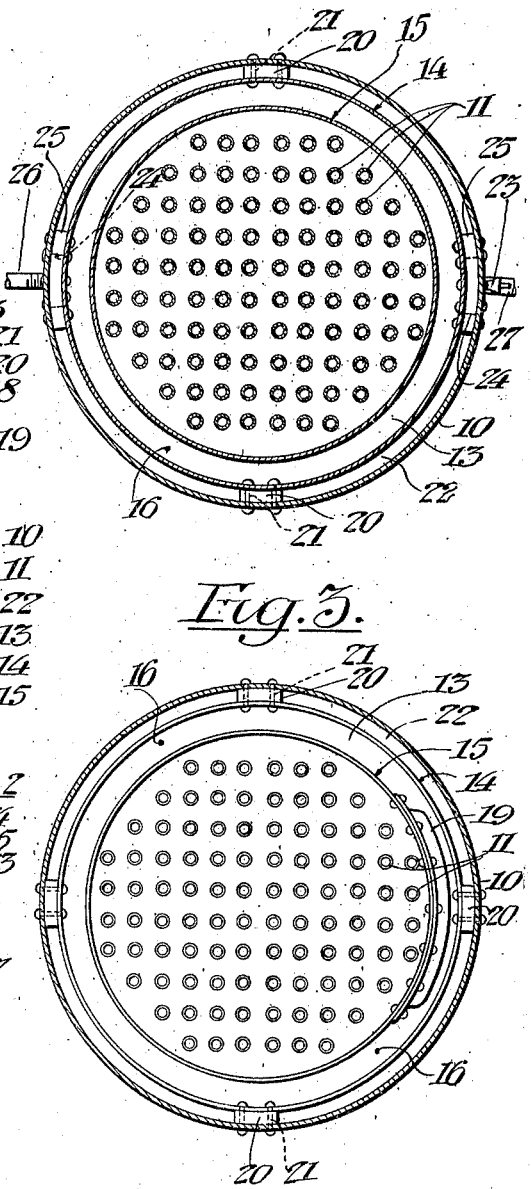

THOMAS T. PARKER, OF BROOKLYN, NEW YORK.

STEAM-BOILER.

1,303,718.   Specification of Letters Patent.   Patented May 13, 1919.

Application filed June 21, 1918. Serial No. 241,105.

*To all whom it may concern:*

Be it known that I, THOMAS T. PARKER, a citizen of the United States, and resident of the city of New York, borough of Brooklyn, in the county of Kings and State of New York, have invented certain new and useful Improvements in Steam-Boilers, of which the following is a specification.

This invention relates to steam boilers and particularly to an improvement in the boiler feed-water structure set out in my Letters Patent of the United States No. 994,655, dated June 6, 1911; which structure comprises a relatively large feed-water purifying chamber which preferably entirely surrounds the bank of tubes within the boiler and has a special overflow connection with the boiler proper at a point above the normal level of the water in the latter and somewhat below the surface of the feed-water within the chamber. The shell of this chamber adjacent the bank of tubes, being exposed to the heat of the boiler water, absorbs some of such heat and transmits it to the feed water contained in the chamber, thus effecting the substantial liberation of the solids in suspension in the feed water. The capacity of the chamber is so relatively large that a given body of water passes through it slowly and thus permits the precipitation of the heavier solids of which a large part sink to the bottom of the chamber. The lighter matters, such as oil and other substances which have not sufficient specific gravity to sink, collect in the upper part of the chamber at or near the surface of the water; but by reason of the described overflow connection the passage of such lighter substances to the boiler proper is effectually prevented.

According to my present improvement I provide a simple and efficient construction whereby an additional heating surface of extended area for the feed water is secured, which surface is subjected directly to the heating influence of the boiler water, thereby attaining a more rapid precipitation of the solids than formerly and thus insuring a more complete removal of the foreign matter from the feed-water preparatory to the ingress of the water to the boiler proper. In the form of my invention herein illustrated, this additional heating surface is constituted by the inner wall of an auxiliary chamber which preferably completely surrounds the feed water chamber, said wall constituting the outer spaced shell of the latter chamber. The auxiliary chamber is in circulatory communication with the water in the boiler proper, and hence such wall absorbs heat from the boiler water and transmits it to the feed water. The two spaced shells constituting the walls of the feed water chamber are preferably so constructed and combined as to provide a unitary structure that can be readily applied to or removed from the boiler proper.

A construction, embodying the principle of my invention, will be hereinafter described in detail, and the precise scope of the invention will be defined in the appended claims.

In the drawings—

Figure 1 is a longitudinal section of a vertical tube boiler equipped with a feed-water structure embodying my improvement.

Figs. 2 and 3 are horizontal sections, as on the lines 2—2 and 3—3, respectively, of Fig. 1.

Fig. 4 is a sectional elevation of a portion of the boiler adjacent one of the hand-holes, as on the line 4—4 of Fig. 1.

Referring to the drawings, 10 designates the shell of a vertical boiler; 11 the bank of tubes therein, and 12 the tube plates at the respective ends of the tubes, all being of any usual or approved construction.

The feed-water purifying chamber 13 surrounds the boiler tubes and extends from a plane near the lower end of the tubes to a plane above the normal level of the water within the boiler, so as to possess relatively large capacity for the purpose previously mentioned. This chamber comprises two cylindrical shells, 14, 15 which are arranged in spaced relation to each other, and are welded or otherwise connected at their lower ends to an annulus 16 which constitutes the bottom of the chamber. The outer shell 14 depends somewhat below the bottom, as at 17, and the inner shell 15 is provided somewhat below its upper end with an elongated discharge opening 18, to which leads a vertical conduit constituted by a depending hood 19 which is affixed to the shell 15 directly above the opening. The outer shell is supported in spaced relation to the shell 10 of the boiler by means of distance blocks 20 which are secured by rivets 21, or in any other suitable manner, to the boiler shell, so as to provide between the latter and the shell 14, a chamber 22 in open communication at its lower end with the water space of the boiler proper, whereby free circulation of the hot boiler water within the chamber 22 is insured. In the present instance there are two diametrically-opposite distance blocks 20 at each end of the shell, but, of course, the number of blocks, or their specific location in the length of the structure, may be altered, as desired.

The boiler shell 10 is provided with hand holes 23 which aline with holes 24 in the adjacent shell 14, so as to facilitate access to the interior of the purifying chamber 13. Elliptic distance or packing rings 25 are interposed between the said shells 10 and 14, in proximity to the hand holes, so as to seal the chamber 22 around such openings.

Feed water is delivered to the chamber 13 through a supply pipe 26, which enters the boiler shell 10 at or near the bottom of the chamber. This chamber is also provided, near its bottom, with a suitably-disposed blowoff pipe 27 which extends through the boiler shell. The boiler shell is provided with a suitable water gage, and pet cocks as usual, (not shown) the same being in communication with the chamber 22 through which the hot boiler water is circulating as above mentioned.

In the construction described in Patent No. 994,655 above referred to, the side of the feed water chamber adjacent the tubes was the only surface available for transmitting the heat from the boiler water to the feed water and thereby precipitating the solids in the liquid; but in the improved construction herein shown and described the heating surface for the feed water is greatly extended since the inner and outer walls of the feed-water chamber are exposed to the hot boiler water which circulates on both sides of said chamber. Therefore the feed water within the chamber 13 is naturally heated to a higher degree than formerly, thus securing greater precipitation of the solids and insuring more efficient purification of the feed water preparatory to its delivery to the boiler proper by way of the discharge opening 18.

By the described arrangement of the spaced apart shells 14, 15 and the basal annulus 16 therefor, a unitary purifying structure is provided, which can be readily installed in or removed from the boiler with comparatively little labor or expense. Further, as the feed-water chamber constituted by said structure is separate from the boiler shell, corrosion of the latter by the chemical action thereon of acids, alkalis, or other foreign properties, in the feed water, is effectually prevented.

I do not limit my invention to the details of construction herein shown and described, as the same may be modified without departing from the principle of the invention as defined in the appended claims.

I claim—

1. The combination with a vertical fire-tube boiler, of a unitary double-walled cylindrical feed-water structure mounted therein in concentric relation to the boiler shell, said structure comprising a basal annulus surrounding the tubes adjacent their lower ends, and two spaced-apart concentric walls rising from said annulus and extending above the normal level of the boiler water, the inner wall having an overflow above such level, and means whereby the outer wall of said structure is maintained in spaced relation to the boiler shell to provide a water space which encircles the concentric feed water chamber and communicates at its lower end with the circulating boiler water, whereby both walls of the structure present wide circumferential areas to the influence of the hot boiler water.

2. The combination with a vertical fire-tube boiler, including a shell having a hand-opening therein, of a unitary double-walled cylindrical feed-water structure mounted therein in concentric relation to the boiler shell, said structure comprising a basal annulus surrounding the tubes adjacent their lower ends and two spaced-apart concentric walls rising from said annulus and extending above the normal level of the boiler water, the inner wall having an overflow above such level and the outer wall having an ingress opening therein in line with said opening of the boiler shell, spacing blocks arranged at intervals between the outer wall of said structure and the boiler shell, and spacing and packing rings in proximity to the alining openings in said outer wall and shell, said walls thus presenting wide circumferential areas to the influence of the hot boiler water.

Signed at the city of New York and State of New York this 18th day of June A. D. 1918.

THOMAS T. PARKER.